(12) United States Patent
Nishimoto et al.

(10) Patent No.: US 11,388,056 B2
(45) Date of Patent: Jul. 12, 2022

(54) INFORMATION MANAGEMENT SYSTEM AND INFORMATION MANAGEMENT METHOD

(71) Applicant: NIPPON TELEGRAPH AND TELEPHONE CORPORATION, Tokyo (JP)

(72) Inventors: Keita Nishimoto, Tokyo (JP); Tomoya Hatano, Tokyo (JP); Kota Asaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/052,884

(22) PCT Filed: May 15, 2019

(86) PCT No.: PCT/JP2019/019275
§ 371 (c)(1),
(2) Date: Nov. 4, 2020

(87) PCT Pub. No.: WO2019/221170
PCT Pub. Date: Nov. 21, 2019

(65) Prior Publication Data
US 2021/0250238 A1     Aug. 12, 2021

(30) Foreign Application Priority Data
May 17, 2018   (JP) .............................. JP2018-095627

(51) Int. Cl.
*H04L 41/0866*    (2022.01)
*H04L 41/0813*    (2022.01)
(Continued)

(52) U.S. Cl.
CPC ...... *H04L 41/0866* (2013.01); *H04L 41/0813* (2013.01); *H04L 41/0843* (2013.01); *H04L 41/0856* (2013.01)

(58) Field of Classification Search
None
See application file for complete search history.

(56) References Cited

U.S. PATENT DOCUMENTS 5,718,854 A  *  2/1998  Nguyen ............. B65H 63/0327
                                                  264/40.1
6,438,563 B1 *  8/2002  Kawagoe ............ G06F 11/1658
(Continued)

OTHER PUBLICATIONS

L. Peterson et al., Central Office Re-Architected as a Data Center, IEEE Communications Magazine, vol. 54 (10), pp. 96-101, Oct. 2016.
(Continued)

*Primary Examiner* — Ranodhi Serrao
(74) *Attorney, Agent, or Firm* — Harness, Dickey & Pierce, P.L.C.

(57) ABSTRACT

An information management system includes a first information storage configured to store first attribute information regarding a communication device, a second information storage configured to store second attribute information regarding the communication device, a related information storage configured to store information representing a relationship between the first attribute information and the second attribute information, a detector configured to detect update, addition, or deletion of the first attribute information or the second attribute information, and an updater configured to output a command for the update of the second attribute information associated with the first attribute information to the second information storage when the update of the first attribute information is detected, and to output a command for the update of the first attribute information
(Continued)

associated with the second attribute information to the first information storage when the update of the second attribute information is detected.

5 Claims, 8 Drawing Sheets

(51) Int. Cl.
*H04L 41/084* (2022.01)
*H04L 41/085* (2022.01)
*H04L 41/0853* (2022.01)

(56) References Cited

U.S. PATENT DOCUMENTS

| | | | | |
|---|---|---|---|---|
| 2003/0140132 A1* | 7/2003 | Champagne | ........ | H04L 41/0856 709/223 |
| 2005/0232263 A1* | 10/2005 | Sagara | ................ | H04L 45/64 370/389 |
| 2006/0092941 A1* | 5/2006 | Kusama | .............. | H04L 47/782 370/392 |
| 2006/0253416 A1* | 11/2006 | Takatsu | ................ | H04L 69/329 |
| 2006/0256711 A1* | 11/2006 | Kusama | ................ | H04L 45/02 370/216 |
| 2011/0164508 A1* | 7/2011 | Arai | ...................... | H04L 45/60 370/245 |
| 2011/0231543 A1* | 9/2011 | Akazawa | ........... | H04L 41/0806 709/224 |
| 2015/0215165 A1* | 7/2015 | Ohsuga | .............. | H04L 41/0863 709/221 |
| 2015/0222483 A1* | 8/2015 | Koide | ................ | H04L 41/0893 370/254 |
| 2015/0249568 A1* | 9/2015 | Koide | .................. | G06F 16/273 370/254 |
| 2015/0256414 A1* | 9/2015 | Koide | .................. | G06F 3/0482 715/735 |
| 2016/0057219 A1 | 2/2016 | Kore et al. | | |

OTHER PUBLICATIONS

Voltha, [online] [Retrieved Apr. 16, 2018] the Internet<URL:https://wiki.opencord.org/display/CORD/VOLTHA>.

Masayuki Iwashita, "Management of OpenFlowswitch using NETCONF and YANG", MPLS Japan 2012 presentation material.

* cited by examiner

FIG. 2

| DEVICE ID | FLOW ID | Match | | Action | | | | COUNTER | COMMON IDENTIFIER |
|---|---|---|---|---|---|---|---|---|---|
| | | in_port | ... | SetVLANVID | | ... | ... | | |
| | | | | vlan_vid | pad | | | | |
| 0x000a | 0x0011 | 0 | ... | 1 | ... | ... | ... | ... | 0x0001 |

FIG. 3

| DEVICE ID | USER NAME | ... | VLAN-ID | COMMON IDENTIFIER |
|---|---|---|---|---|
| 0x000a | "ADAM" | ... | 1 | 0x0001 |
| | ... | | | |

FIG. 4

| ROUTE INFORMATION DATABASE | LINE INFORMATION DATABASE |
|---|---|
| Action → SetVLANVID → vlan_vid | VLAN-ID |
| DEVICE ID | DEVICE ID |
| COMMON IDENTIFIER | COMMON IDENTIFIER |

FIG. 7

| DEVICE ID | PORT NUMBER | ... | RX COUNTER | COMMON IDENTIFIER |
|---|---|---|---|---|
| 0x000a | 1 | ... | 10 | 0x0001 |
|  | ... |  |  |  |

FIG. 8

| DEVICE INFORMATION DATABASE | ROUTE INFORMATION DATABASE |
|---|---|
| RX COUNTER | COUNTER |
| ... | ... |

FIG. 10

| DEVICE ID | USER NAME | ... | VLAN-ID | IDENTIFIER |
|---|---|---|---|---|
| BLANK | DEFAULT ("NO NAME") | ... | BLANK | BLANK |
| | ... | | | |

FIG. 11

| ROUTE INFORMATION DATABASE | LINE INFORMATION DATABASE | DEVICE INFORMATION DATABASE |
|---|---|---|
| Action → SetVLANVID → vlan_vid | VLAN-ID | BLANK |
| COUNTER | BLANK | RX COUNTER |
| DEVICE ID | DEVICE ID | DEVICE ID |
| COMMON IDENTIFIER | COMMON IDENTIFIER | COMMON IDENTIFIER |

INFORMATION MANAGEMENT SYSTEM AND INFORMATION MANAGEMENT METHOD

CROSS-REFERENCE TO RELATED APPLICATIONS

This application is a 371 National Stage of International Application No. PCT/JP2019/019275 filed on May 15, 2019, which claims priority to Japanese Patent Application No. 2018-095627, filed May 17, 2018. The entire disclosures of the above applications are incorporated herein by reference.

TECHNICAL FIELD

The present invention relates to an information management system and an information management method.
Priority is claimed on Japanese Patent Application No. 2018-095627, filed May 17, 2018, the content of which is incorporated herein by reference.

BACKGROUND ART

In recent years, application of a software-defined network (SDN) to an access network (for example, a central office re-architected as a datacenter (CORD)) has been studied (refer to Non-Patent Document 1).

In addition, a technology (for example, virtual optical line termination hardware abstraction (VOLTHA)) for abstracting an access network such as a passive optical network (PON) or data over cable service interface specifications (DOCSIS) and presenting an L2 switch (layer2 switch) corresponding to an SDN protocol to an SDN controller has been studied (refer to Non-Patent Document 2). As a result, integrated management of a core network and an access network and flexible control that a conventional access network cannot achieve are expected to be realized.

In a conventional SDN architecture, on a premise that management information (for example, line information or the like) that is information regarding management of a communication device and route information are independent, a functional portion that controls the route information and a functional portion that manages management information are independently prepared. For example, the functional portion (OpenFlow Controller) that controls the route information and the functional portion (OpenFlow Configuration Point) that controls the management information are independently prepared in Open-Flow that is one of SDN protocols (Non-Patent Document 3).

CITATION LIST

Patent Literature

Non-Patent Literature

[Non-Patent Document 1]
L. Peterson et al., "Central Office Re-Architected as a Data Center," IEEE Communications Magazine, Vol. 54 (10), pp. 96-101, 2016.
[Non Patent Literature 2]
"VOLTHA," [online], [Retrieved Apr. 16, 2018], the Internet <URL: https: //wiki.opencord.org/display/CORD/VOLTHA>
[Non Patent Literature 3]
Masayuki Iwashita, "Management of OpenFlowswitch using NETCONF and YANG," MPLS JAPAN 2012 presentation material

SUMMARY OF INVENTION

Technical Problem

In actual operations, inconsistency may occur between the route information and the management information. For example, when the management information is line information, for example, line information in which a VLAN-ID "No. 10" is assigned to a line is recorded in a line information database in a conventional information management system. In the conventional information management system, route information representing a flow rule that a packet with the VLAN-ID "No. 10" is transferred to the line is recorded in a route information database. Here, when the VLAN-ID is updated in the line information, it is necessary to curb inconsistency from occurring between the route information and the line information by updating the route information according to the update of the VLAN-ID in the line information in the information management system.

However, there have been many cases in which the inconsistency cannot be curbed from occurring between the route information and the line information in the conventional information management system. Such problems are not problems limited to the line information, but are problems common to the management information and the route information of a communication device.

In view of the circumstances described above, an object of the present invention is to provide an information management system and an information method capable of curbing inconsistency from occurring between the management information and the route information of a communication device.

Solution to Problem

According to an aspect of the present invention, an information management system includes a first information storage configured to store at least one or more pieces of first attribute information that is attribute information of first information regarding a communication device, a second information storage configured to store at least one or more pieces of second attribute information that is attribute information of second information regarding the communication device, a related information storage configured to store related information that is information representing a relationship between the first attribute information and the second attribute information, a detector configured to detect update, addition, or deletion of the first attribute information or the second attribute information, and an updater configured to output a command for the update, addition, or deletion of the second attribute information associated with the first attribute information in the related information to the second information storage when the update, addition, or deletion of the first attribute information is detected, and to output a command for the update, addition, or deletion of the first attribute information associated with the second attribute information in the related information to the first information storage when the update, addition, or deletion of the second attribute information is detected.

According to one aspect of the present invention, in the information management system described above, the first information is information regarding a route of the communication device, and the second information is information regarding management of the communication device.

According to one aspect of the present invention, in the information management system described above, the information regarding management is information regarding at least one of a line and a device.

According to one aspect of the present invention, the information management system described above further includes an information generator configured to generate the second attribute information associated with the first attribute information in the related information when the addition of the first attribute information is detected, and to generate the first attribute information associated with the second attribute information in the related information when the addition of the second attribute information is detected, in which the updater is configured to output a command for addition of the second attribute information to the second information storage when the second attribute information is generated, and output a command for addition of the first attribute information to the first information storage when the first attribute information is generated.

According to one aspect of the present invention, in the information management system described above, the information generator is configured to generate the first attribute information or the second attribute information on the basis of a template.

According to another aspect of the present invention, an information management method is an information management method which is executed by an information management system including a first information storage configured to store one or more pieces of first attribute information that is attribute information of first information regarding a communication device, a second information storage configured to store one or more pieces of second attribute information that is attribute information of second information regarding the communication device, and a related information storage configured to store related information that is information representing a relationship between the first attribute information and the second attribute information, and includes detecting update, addition, or deletion of the first attribute information or the second attribute information, and outputting a command for the update, addition, or deletion of the second attribute information associated with the first attribute information in the related information to the second information storage when the update, addition, or deletion of the first attribute information is detected, and outputting a command for the update, addition, or deletion of the first attribute information associated with the second attribute information in the related information to the first information storage when the update, addition, or deletion of the second attribute information is detected.

Advantageous Effects of Invention

According to the present invention, it is possible to curb inconsistency from occurring between the management information and the route information of a communication device.

BRIEF DESCRIPTION OF DRAWINGS

FIG. 2 is a diagram which shows an example of a route information data table in the first embodiment.

FIG. 3 is a diagram which shows an example of a line information data table in the first embodiment.

FIG. 4 is a diagram which shows an example of a related information data table in the first embodiment.

FIG. 7 is a diagram which shows an example of a device information data table in the second embodiment.

FIG. 8 is a diagram which shows an example of a related information data table in the second embodiment.

FIG. 10 is a diagram which shows an example of a template of a line information data table in the third embodiment.

FIG. 11 is a diagram which shows a modified example of a related information database.

DESCRIPTION OF EMBODIMENTS

Embodiments of the present invention will be described in detail with reference to the drawings.

First Embodiment

Figure 1:
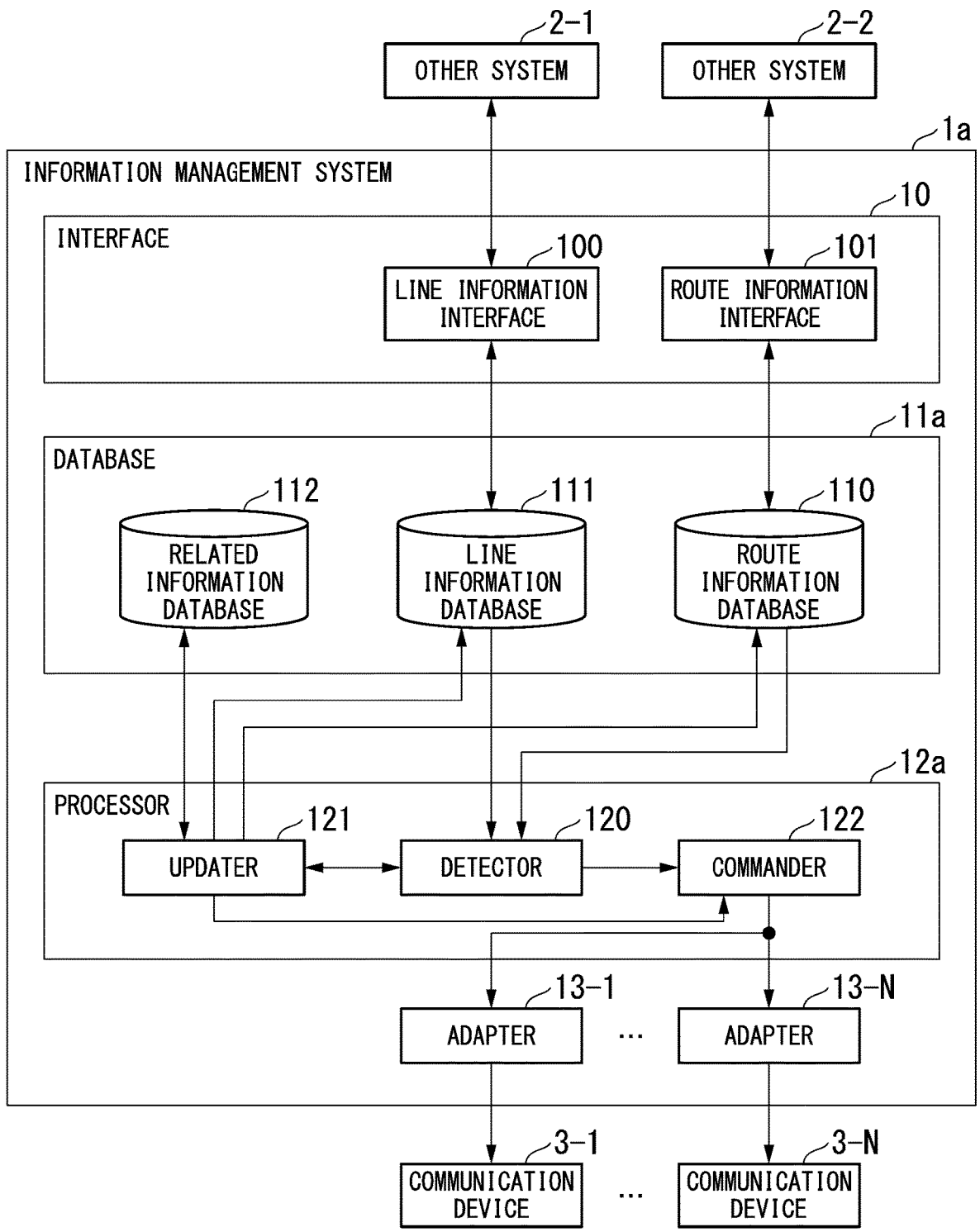
FIG. 1 is a diagram which shows an example of a configuration of an information management system in a first embodiment.

FIG. 1 is a diagram which shows an example of a configuration of an information management system 1a. The information management system 1a is a system which manages management information that is information regarding management of a communication device and route information. The information management system 1a is provided in, for example, an SDN controller and controls route information and management information of the communication device using OpenFlow, which is one SDN protocol. The management information of the communication device is not limited to specific information regarding the management of the communication device, but is line information as an example in the first embodiment.

Another system 2 is a system (external system) other than the information management system 1a, and is, for example, a host device such as a server. The other system 2 may be a functional portion provided in the information management system 1a.

A communication device 3 is a communication device of an access network and is, for example, an in-station device (optical line terminal (OLT)). The communication device 3 communicates with the information management system 1a on the basis of management information acquired from the information management system 1a. The communication device 3 accommodates user terminals such as personal computers, smartphone terminals, and tablet terminals on the basis of the management information. The communication device 3 may further acquire route information from the information management system 1a. The communication device 3 may also accommodate the user terminals on the basis of the acquired management information and route information.

The information management system 1a includes an interface 10, a database 11a, a processor 12a, and N adapters 13. The information management system 1a includes an adapter 13 for each communication device 3 or each communication protocol.

The information management system 1a may be provided as a single device, for example, as a control device. Some or all of the interface 10, the database 11a, the processor 12a, and the adapter 13 are realized by a processor such as a central processing unit (CPU) executing a program stored in a storage. The storage is preferably, for example, a non-volatile recording medium (non-temporary recording medium) such as a flash memory or a hard disk drive (HDD). The storage may include a volatile recording medium such as a random access memory (RAM). The program may be recorded in a computer readable recording medium. The computer readable recording medium is, for example, a portable medium such as a flexible disk, a magneto-optical disc, a read only memory (ROM), or a compact disc read only memory (CD-ROM), or a non-temporary storage medium such as a storage device like a hard disk embedded in a computer system. The program may be transmitted via a telecommunication line. Some or all of the interface 10, the database 11a, the processor 12a, and the adapter 13 may also be realized using, for example, hardware including an electronic circuit or circuitry using a large scale integration circuit (LSI), an application specific integrated circuit (ASIC), a programmable logic device (PLD), a field programmable gate array (FPGA), or the like.

The interface 10 is a functional portion that communicates with the other system 2.

The database 11a stores various types of information such as line information and route information. The database 11a is preferably a non-volatile recording medium (non-temporary recording medium) such as a flash memory or an HDD. The database 11a may include a volatile recording medium such as a RAM.

The processor 12a is a functional portion that executes processing on the basis of various types of information stored in the database 11a.

The adapter 13 is a functional portion that communicates with the communication device 3.

Next, a change (update or addition) of some of the line information and the route information stored in the database 11a will be described.

The interface 10 includes a line information interface 100 and a route information interface 101. The line information interface 100 acquires line information and a command indicating update or addition of the line information from the other system 2-1.

When line information and a command indicating update are acquired, the line information interface 100 converts the line information acquired from the other system 2-1 into line information in a form suitable for an information scheme of the database 11a. The line information interface 100 updates the line information stored in the database 11a with converted line information.

When line information and a command indicating addition are acquired, the line information interface 100 converts the line information acquired from the other system 2-1 into the line information in a form suitable for the information scheme of the database 11a. The line information interface 100 adds the converted line information to the database 11a.

The line information interface 100 acquires a signal requesting line information from the other system 2-1. The line information interface 100 acquires line information from the database 11a when the signal requesting the line information is acquired. The line information interface 100 transmits the line information acquired from the database 11a to the other system 2-1 as a response to the request.

The route information interface 101 acquires route information and a command indicating update or addition of the route information from other system 2-2. When route information and a command indicating update are acquired, the route information interface 101 converts the route information acquired from the other system 2-1 into route information in a form suitable for the information scheme of the database 11a. The route information interface 101 updates the route information stored in the database 11a with converted route information.

When route information and a command indicating addition are acquired, the route information interface 101 converts the route information acquired from the other system 2-1 into route information in a form suitable for the information scheme of the database 11a. The route information interface 101 adds the converted route information to the database 11a.

The route information interface 101 acquires a signal requesting route information from the other system 2-2. When the signal requesting route information is acquired, the route information interface 101 acquires the route information from the database 11a. The route information interface 101 transmits the route information acquired from the database 11a to the other system 2-2 as a response to the request.

The database 11a includes a route information database 110, a line information database 111, and a related information database 112. The route information database 110 stores a route information data table that is a data table of route information.

FIG. 2 is a diagram which shows an example of the route information data table. Attribute information (items) of the route information data table includes a device ID (an identifier of the communication device 3), a flow ID, a match, an action, a counter, and a common identifier. Respective pieces of the attribute information are associated with each other in the route information data table. The attribute information is attribute information based on, for example, an SDN architecture such as OpenFlow. For example, the flow ID is a FlowID in OpenFlow, and is an identifier of a route of the communication device 3.

The route information shown in FIG. 2 indicates, for example, that the communication device 3 to which a device ID (0x000a) expressed in hexadecimal number is assigned gives a VLAN tag (VLAN-ID=1) to a packet input from a port "0" of a route to which a flow ID (0x0011) is assigned.

The common identifier is a common identifier between the route information database 110 that stores route information and the line information database 111 that stores line information. Line information and route information to which the same common identifier is assigned are associated with each other. The common identifier may be an identifier (for example, a combination of FlowID and Device ID in OpenFlow) defined in at least one of the route information and the line information, or may be a uniquely defined identifier.

For example, in any of a case in which a plurality of pieces of route information are associated with a single piece of line information, a case in which a plurality of pieces of line information are associated with a single piece of route information, and a case in which a plurality of pieces of line information are associated with a plurality of pieces of route information, the common identifier may be uniquely defined for simplicity. In addition, a plurality of common identifiers may be associated with a single piece of attribute information in the route information and a single piece of attribute information in the line information. A value of a common identifier shown in FIG. 2 is a value of a uniquely defined identifier and is (0x0001) as an example.

When the route information interface 101 acquires route information and the command indicating update from the other system 2-2, the route information database 110 acquires the route information acquired from the other system 2-2 from the route information interface 101. The route information database 110 updates route information of the route information data table with the route information acquired from the other system 2-2.

For example, the route information database 110 acquires a command for updating a set value "1" of the VLAN-ID in the route information to which the common identifier 0x0001 is assigned to, for example, "2" from the route information interface 101. A form of the command is, for example, a form of a FlowMod message of OpenFlow. The route information database 110 acquires a flow ID (0x0011) and a device ID (0x000a), and an update value "2" of route information to be updated (hereinafter referred to as "update target route information").

The route information database 110 specifies update target route information in the route information data table on the basis of the device ID (0x000a) and the flow ID (0x0011). In the route information database 110, a set value "1" of "vlan_vid" of the specified update target route information is updated to "2."

The line information database 111 (management information database) stores a line information data table that is a data table of line information.

FIG. 3 is a diagram which shows an example of the line information data table. Attribute information (items) of the line information data table includes a device ID, a user name, a VLAN-ID, and a common identifier. Line information shown in FIG. 3 indicates that the communication device 3 to which the device ID (0x000a) is assigned accommodates a user terminal "ADAM." In addition, the line information shown in FIG. 3 indicates that the VLAN tag (VLAN-ID=1) is given to a packet input to the communication device 3 to which the device ID (0x000a) is assigned.

The line information data table may further include an ID (user ID) of a user terminal associated with a line to which a VLAN-ID is assigned, a logical link ID (LLID), a minimum amount and a maximum amount of a bandwidth assigned to the user terminal, a guaranteed delay amount, a communication rate, a media access control (MAC) address of a home device (for example, an optical network unit (ONU)), and a service type as an example of the attribute information of the line information.

When the line information interface 100 has acquired the line information and the command indicating update from the other system 2-1, the line information database 111 acquires the line information acquired from the other system 2-1 from the line information interface 100. The line information database 111 updates line information of the line information data table with the line information acquired from the other system 2-1.

The related information database 112 stores a related information data table that is a data table of related information. The related information is information indicating a relationship (corresponding relationship) between the attribute information of the route information and the attribute information of the line information. When line information is updated in the line information data table, the related information is used for the processor 12a to specify route information updated in the route information data table. In addition, when route information is updated in the route information data table, the related information is used to specify line information updated in the line information data table.

FIG. 4 is a diagram which shows an example of the related information data table. Items of the related information data table include a route information database and a line information database. When route information is updated in the route information database 110, line information of the line information database 111 associated with the updated route information in the related information data table is updated in the line information database 111.

Note that some of the attribute information of the route information of the route information database may not be associated with the attribute information of the line information of the line information database in the related information data table. That is, some of the attribute information of the route information database or the line information database may also be blank (invalid information), indicating information that has no mutual relationship in the related information data table.

In FIG. 4, the attribute information "Action→SetVLA-NID→vlan_vid" of the route information of the route information database and the "VLAN-ID" of the line information of the line information database are associated with each other. Therefore, when the attribute information "vlan_vid" of the route information database is updated, the "VLAN-ID" of the line information database is updated. In addition, when "VLAN-ID" of the line information database is updated, the "vlan-vid" of the route information database is updated.

Returning to FIG. 1, description of the configuration of the information management system 1a will continue. The related information database 112 acquires an identifier of an update source database (hereinafter referred to as an "update source database identifier") and attribute information updated in the update source database (hereinafter, referred to as "update source attribute information") from the processor 12a.

The related information database 112 outputs an identifier of a database associated with a database indicated by an update source database identifier in the related information data table to the processor 12a as an identifier of an update target database (hereinafter, referred to as an "update target database identifier"). The related information database 112 outputs attribute information of the database associated with the database indicated by an update source database identifier in the related information data table to the processor 12a as attribute information updated in the update target database (hereinafter referred to as "update target attribute information").

For example, when the database indicated by the acquired update source database identifier is the route information database 110, the related information database 112 outputs an identifier of the line information database 111 associated with the route information database 110 in the related information data table to the processor 12a as the update target database identifier. The related information database 112 outputs attribute information of the line information database 111 associated with the route information database 110 in the related information data table to the processor 12a as the update target attribute information.

For example, when the database indicated by the acquired update source database identifier is the line information database 111, the related information database 112 outputs an identifier of the route information database 110 associated with the line information database 111 in the related information data table to the processor 12a as the update target database identifier. The related information database 112 outputs attribute information of the route information database 110 associated with the line information database 111 in the related information data table to the processor 12a as the update target attribute information.

When the database indicated by an update source database identifier is not present in the related information data table, the related information database 112 outputs to the processor 12a information indicating that the update source database is not present in the related information data table. When a database associated with the database indicated by an update source database identifier is not present in the related information data table, the related information database 112 outputs to the processor 12a information indicating that the update target database is not present in the related information data table. When attribute information of the database associated with the database indicated by an update source database identifier is not present in the related information data table, the related information database 112 outputs to the processor 12a information indicating that the update target attribute information is not present in the related information data table.

The processor 12a includes a detector 120, an updater 121, and a commander 122. The detector 120 detects an update of the route information stored in the route information database 110 according to periodic polling or an update notification from the route information database 110. The detector 120 detects an update of the line information stored in the line information database 111 according to periodic polling or an update notification from the line information database 111.

When route information or line information is updated or added by the interface 10, the detector 120 outputs an update type indicating a partial change, an update source database identifier, update source attribute information, an update value, and a common identifier (hereinafter referred to as an "update source common identifier") associated with this attribute information in the update source database to the updater 121. The detector 120 acquires a device ID, a common identifier, and attribute information of the updated route information or line information from the updater 121. The detector 120 may also acquire this information from the database 11a. The detector 120 outputs the device ID, the common identifier, and the attribute information of the updated route information or line information to the commander 122.

When the detector 120 has detected the update or addition of the route information or line information, the updater 121 acquires an update type indicating a partial change, an update source database identifier, update source attribute information, and an update value from the detector 120.

For example, when the set value of "Action→SetVLANID→vlan-vid" of the route information data table shown in FIG. 2 is changed to "2," the updater 121 acquires an update type indicating a partial change, an update source database identifier (an identifier assigned to the route information database 110), update source attribute information (information indicating "Action→SetVLANID→vlan-vid"), an update value (2), and an update source common identifier (0x0001) from the detector 120.

The updater 121 outputs the update source database identifier and the update source attribute information to the related information database 112. For example, the updater 121 outputs the identifier of the route information database acquired from the detector 120 and the update source attribute information (information indicating "Action→SetVLANID→vlan-vid") to the related information database 112.

The updater 121 acquires an update target database identifier and update target attribute information from the related information database 112 as a response. For example, the updater 121 acquires an identifier assigned to the line information database 111, a "VLAN-ID" that is the update target attribute information of the line information database 111, a "device ID," and a "common identifier" from the related information database 112.

The updater 121 outputs a command for updating a part of a data table stored in the update target database on the basis of the update target database identifier and the update target attribute information to the update target database. For example, the updater 121 outputs a command for updating the set value of "VLAN-ID" that is update target attribute information associated with the acquired device ID and command identifier in the line information data table of the line information database 111 to the update value "2" to the line information database 111.

The updater 121 acquires the device ID (0x000a) and the common identifier (0x0001) from the route information database 110. The updater 121 notifies the commander 122 of the update source database identifier, the device ID and common identifier acquired from the route information database 110, and the attribute information updated in the route information database 110.

Note that, when a device ID and a common identifier have been updated in the line information database 111, the updater 121 may acquire the device ID and common identifier from the line information database 111. The updater 121 may notify the commander 122 of the update source database identifier, the device ID and common identifier acquired from the line information database 111, and the attribute information updated in the line information database 111.

Figure 5:
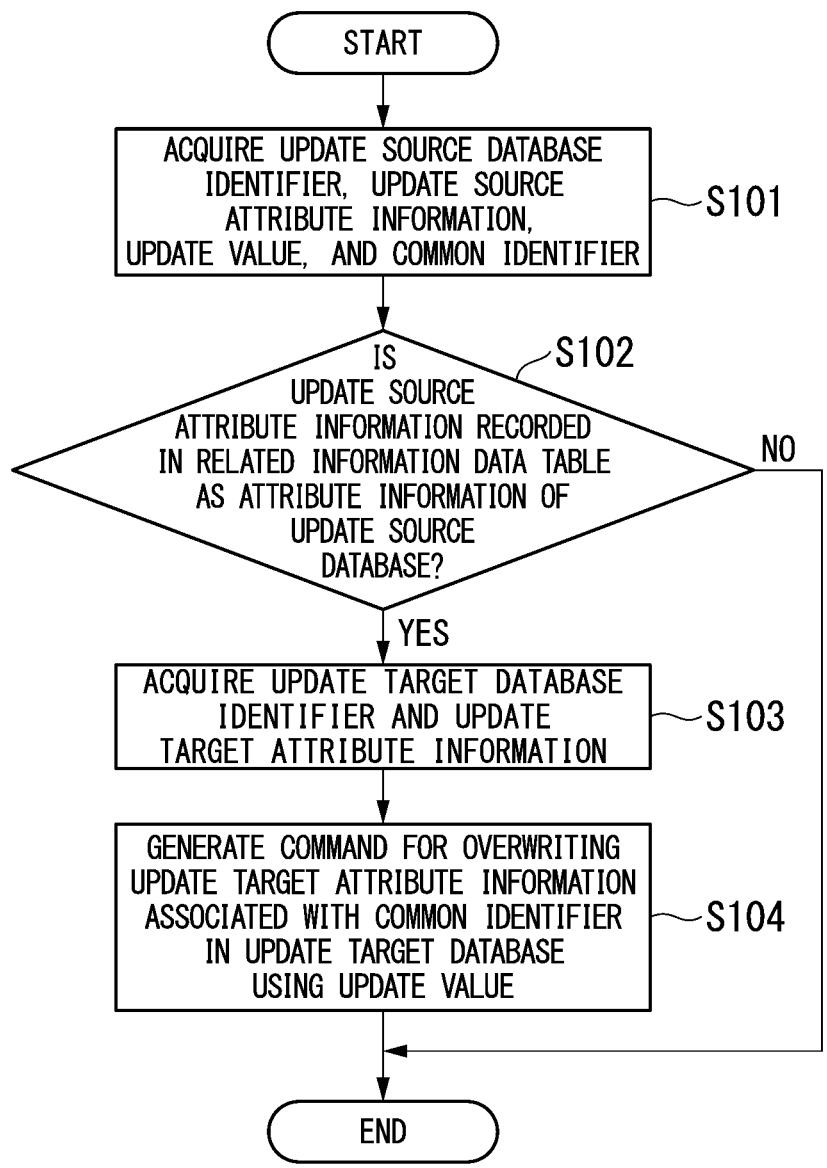
FIG. 5 is a flowchart which shows an example of operations of an updater and a related information database in the first embodiment.

FIG. 5 is a flowchart which shows an example of operations of the updater 121 and the related information database 112. The updater 121 acquires an update source database identifier, update source attribute information, and an update value from the detector 120 (step S101).

The related information database 112 determines whether the update source attribute information acquired by the updater 121 is recorded in the related information data table as the attribute information of an update source database (step S102). When the acquired update source attribute information is not recorded in the related information data table as the attribute information of an update source database (NO in step S102), the updater 121 ends processing without updating the route information database 110 and the line information database 111.

When the acquired update source attribute information is recorded in the related information data table as the attribute information of an update source database (YES in step S102), the updater 121 acquires an update target database identifier and update target attribute information from the related information database 112 (step S103). The updater 121 generates a command for overwriting update target attribute information associated with a common identifier in an update target database using an update value for the update target database (step S104).

Returning to FIG. 1, description of the configuration of the information management system 1a will continue. The commander 122 acquires a device ID, a common identifier, and the attribute information of the updated route information or line information from the detector 120. The commander 122 may also acquire this information from the updater 121 or the database 11a.

The commander 122 generates a command given to the adapter 13 on the basis of the attribute information of the updated route information or line information, and the device ID. For example, the commander 122 generates a command for updating "VLAN-ID" associated with the common identifier (0x0001) in the route information data table to "2" for the communication device 3 of the device ID (0x000a) associated with the common identifier (0x0001).

The commander 122 stores information indicating a connection relationship between a device ID of the communication device 3 and the adapter 13 in advance. The commander 122 selects the adapter 13 on the basis of the information indicating the connection relationship. The commander 122 outputs a command to the selected adapter 13. For example, the commander 122 outputs a command to an adapter 13-1 associated with a communication device 3-1 of the device ID (0x000a).

The adapter 13 acquires a command for adding or updating some of the line information or route information from the commander 122. The adapter 13 converts a form of the acquired command into a form of each communication protocol or communication device 3. The adapter 13 transmits a converted command to one or more communication devices 3. For example, the adapter 13 transmits the converted command to the communication device 3 as management information. Note that the converted command may include a command for complicated processing such as restart processing.

Next, deletion of the line information, route information, and the like stored in the database 11a will be described.

The line information interface 100 acquires a command indicating deletion of line information, and at least some line information to be deleted from the other system 2-1. For example, the line information interface 100 acquires the command indicating deletion and at least some of the line information to be deleted (for example, a device ID).

The line information interface 100 deletes line information regarding the acquired attribute information among one or more pieces of line information stored in the line information database 111 from the line information database 111. For example, the line information interface 100 deletes line information regarding the acquired device ID among one or more pieces of line information stored in the line information database 111 from the line information database 111.

The route information interface 101 acquires a command indicating deletion of route information and at least some of route information to be deleted from the other system 2-2. For example, the route information interface 101 acquires the command indicating deletion, and the attribute information (for example, a device ID and a flow ID) of the route information to be deleted.

The route information interface 101 deletes route information regarding the acquired attribute information among one or more pieces of route information stored in the route information database 110 from the route information database 110. For example, the route information interface 101 deletes route information regarding the acquired device ID and flow ID among one or more pieces of route information stored in the route information database 110 from the route information database 110.

When some of the route information or line information is deleted by the interface 10, the detector 120 outputs an update type indicating deletion, an update source database identifier, and an update source common identifier (an update target common identifier) to the updater 121. In FIG. 2, the detector 120 outputs the update type indicating deletion, the update source database identifier (the route information database), and the update source common identifier (0x0001) to the updater 121.

The updater 121 outputs the update source database identifier to the related information database 112. The updater 121 acquires an update target database identifier from the related information database 112 as a response. For example, the updater 121 acquires an identifier assigned to the line information database 111 from the related information database 112.

The updater 121 generates a command for deleting attribute information associated with a common identifier for the database indicated by an update source database identifier. For example, the updater 121 generates a command for deleting all attribute information associated with the common identifier (0x0001) from the line information data table for the line information database 111 indicated by an update source database identifier.

The updater 121 outputs a command for deleting attribute information associated with a common identifier from the line information data table to the update target database. In addition, the commander 122 operates similarly to a case in which the attribute information of the line information and the route information is updated or added.

As described above, the information management system 1a of the first embodiment includes the route information database 110 (referred to as a "first information storage"), the line information database 111 (also referred to as a "second information storage"), a related information database 112 (also referred to as a related information storage), the detector 120, and the updater 121. The route information database 110 stores one or more pieces of first attribute information that is attribute information of first information regarding a communication device. The line information database 111 stores one or more pieces of second attribute information that is attribute information of second information regarding the communication device. The related information database 112 stores related information that is information indicating a relationship of the first attribute information and the second attribute information.

The first information is, for example, route information of the communication device. The second information is, for example, management information of the communication device. The management information is, for example, line information.

The detector 120 detects the update or deletion of the first attribute information or the second attribute information. When the update or deletion of the first attribute information is detected, the updater 121 outputs a command for updating, adding, or deleting the second attribute information associated with the first attribute information in the related information data table to the line information database 111. When the update, addition, or deletion of the second attribute information is detected, the updater 121 outputs a command for updating, adding, or deleting the first attribute information associated with the second attribute information in the related information data table to the route information database 110.

As a result, even if some information of a database is changed (added, updated, deleted) by the other system 2, the information management system 1a of the first embodiment can curb inconsistency from occurring between the management information and the route information of the communication device.

Second Embodiment

A second embodiment is different from the first embodiment in that the information of a database is updated, added, or deleted (hereinafter referred to as an "update or the like") on the basis of information output from the communication device to the information management system. In the second embodiment, differences from the first embodiment will be described.

Figure 6:
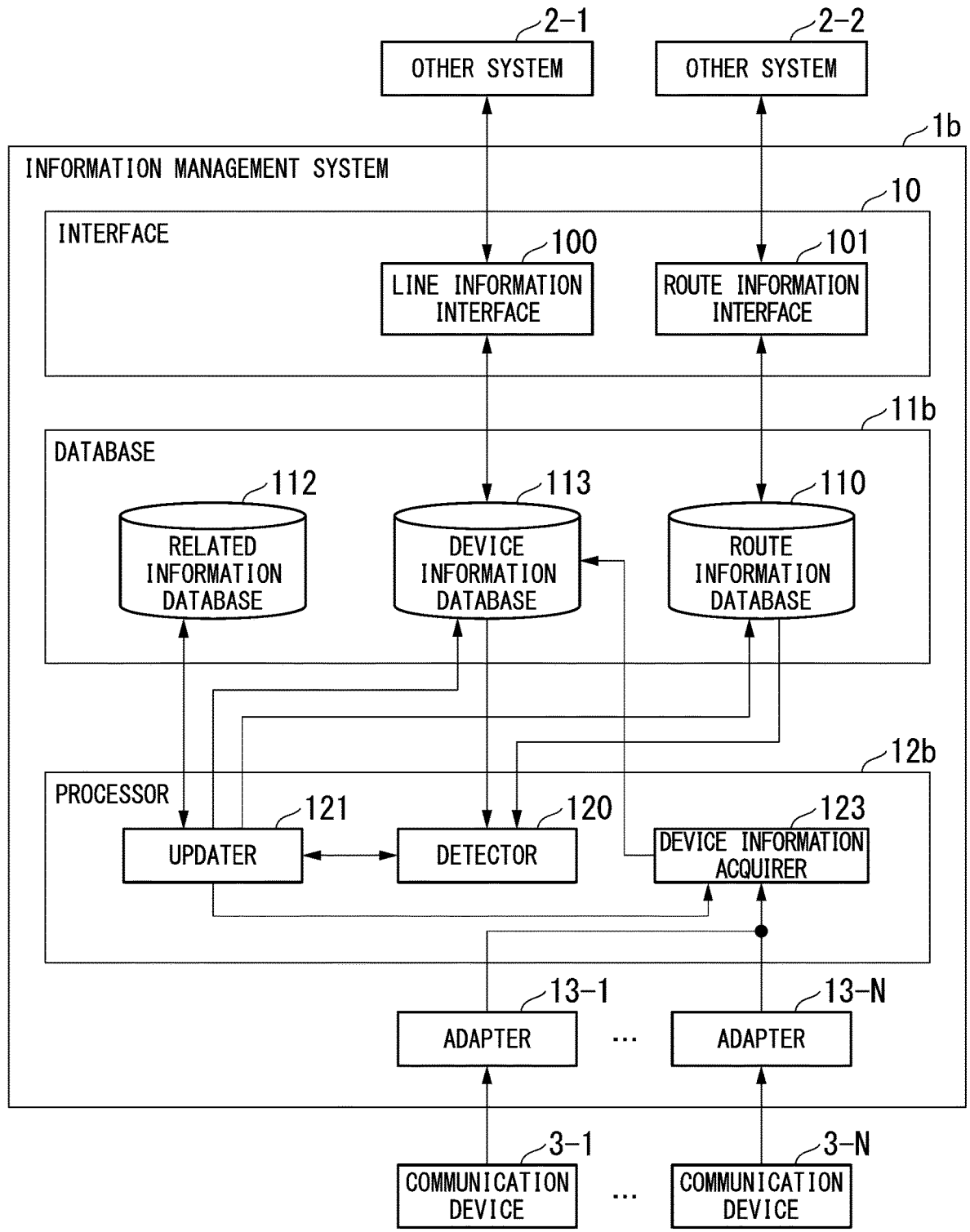
FIG. 6 is a diagram which shows an example of a configuration of an information management system in a second embodiment.

FIG. 6 is a diagram which shows an example of a configuration of an information management system 1b. The information management system 1b includes an interface 10, a database 11b, a processor 12b, and N adapters 13. The database 11b includes the route information database 110, the related information database 112, and a device information database 113. The database 11b may further include the line information database 111.

In the second embodiment, an update source database identifier indicates, for example, the device information database 113. The device information database 113 stores a device information data table that is a data table of information regarding the communication device 3. In the second embodiment, the management information is information (device information) regarding the communication device as an example.

FIG. 7 is a diagram which shows an example of the device information data table. Attribute information (items) of the device information data table includes a device ID, a port number, an RX counter, and a common identifier (0x0001). Device information shown in FIG. 7 indicates that the number of times (RX counter) a signal transmitted from the communication device 3 to which a device ID (0x000a) is assigned is received at a port "1" of the adapter 13 is 10 times.

FIG. 8 is a diagram which shows an example of the related information data table. The items of the related information data table include a device information database and a route information database. When device information is updated in the device information database 113, route information of the route information database 110 associated with the updated device information in the related information data table is updated in the route information database 110.

Note that some attribute information of device information of the device information database may not be associated with the attribute information of the route information of the route information database in the related information data table. That is, some of the attribute information of the device information database or the route information database may also be blank (invalid information) in the related information data table.

In FIG. 8, attribute information "RX counter" of the device information of the device information database and attribute information "counter" of the route information of the route information database are associated with each other. When the "RX counter" of the device information database is updated, the "counter" of the route information database is updated. When the "counter" of the route information database is updated, the "RX counter" of the device information database may also be updated.

The processor 12b includes a detector 120, an updater 121, and a device information acquirer 123. The processor 12b may further include a commander 122. The device information acquirer 123 acquires information corresponding to a signal transmitted from the communication device 3 to the information management system 1b from the adapter 13. The information corresponding to the transmitted signal is, for example, RX count information indicating the number of times the transmitted signal is received.

The device information acquirer 123 converts the information acquired from the adapter 13 into a format suitable for an information scheme of the device information database 113. The device information acquirer 123 generates a command for updating the RX counter associated with the common identifier (0x0001) with respect to the device information database 113 indicated by an update source database identifier.

The updater 121 acquires an update type indicating a partial change, an update source database identifier, update source attribute information, and an update value from the detector 120 when the detector 120 has detected a partial change in the device information.

For example, when a set value of "RX counter" of the device information data table shown in FIG. 7 is changed to "10," the updater 121 acquires the update type indicating a partial change, the update source database identifier (identifier assigned to the device information database 113), the update source attribute information (information indicating "RX counter"), the update value (10), and the update source common identifier (0x0001) from the detector 120.

The updater 121 outputs the update source database identifier and the update source attribute information to the related information database 112. For example, the updater 121 outputs the identifier of the device information database and the update source attribute information (information indicating "RX counter") acquired from the detector 120 to the related information database 112.

The updater 121 acquires an update target database identifier and update target attribute information from the related information database 112 as a response. For example, the updater 121 acquires an identifier of the route information database and the "counter" that is update target attribute information of the route information database 110 from the related information database 112.

The updater 121 outputs a command for updating a part of a data table stored in an update target database to the update target database on the basis of the update target database identifier and the update target attribute information. For example, the updater 121 outputs a command for updating the set value of "counter" which is update target attribute information associated with the acquired device ID and common identifier to the update value "10" in the route information data table of the route information database 110 to the route information database 110.

The route information interface 101 acquires a signal requesting route information from the other system 2-1. When the route information interface 101 acquires the signal requesting route information, the route information interface 101 acquires route information from the route information database 110. The route information interface 101 transmits the route information acquired from the route information database 110 to the other system 2-2.

As described above, the information management system 1b of the second embodiment includes the device information database 113 (also referred to as the "first information storage"), the route information database 110 (also referred to as the "second information storage"), the related information database 112 (also referred to as the "related information storage"), the detector 120, the updater 121, and the device information acquirer 123. The device information database 113 stores one or more pieces of first attribute information which is attribute information of first information regarding the communication device. The route information database 110 stores one or more pieces of second attribute information which is attribute information of second information regarding the communication device. The related information database 112 stores related information which is information indicating a relationship between the first attribute information and the second attribute information.

The first information is, for example, the management information of the communication device, and the management information is, for example, device information. The second information is, for example, route information of the communication device.

The detector 120 detects update or deletion of the first attribute information or the second attribute information. When the update or deletion of the first attribute information is detected, the updater 121 outputs a command for updating, adding, or deleting the second attribute information associated with the first attribute information in the related information data table to the route information database 110. When the update, addition, or deletion of the second attribute information is detected, the updater 121 outputs a command for updating, adding, or deleting the first attribute information associated with the second attribute information in the related information data table to the device information database 113.

As a result, the information management system 1b of the second embodiment can curb inconsistency from occurring between the management information and the route information in the information management system 1b of the communication device even if the information of the database is updated or the like on the basis of the information output from the communication device to the information management system.

Third Embodiment

A third embodiment differs from the first embodiment in that the information management system further includes an information generator that generates information to be added to the management information or route information. In the third embodiment, differences from the first embodiment will be described.

Figure 9:
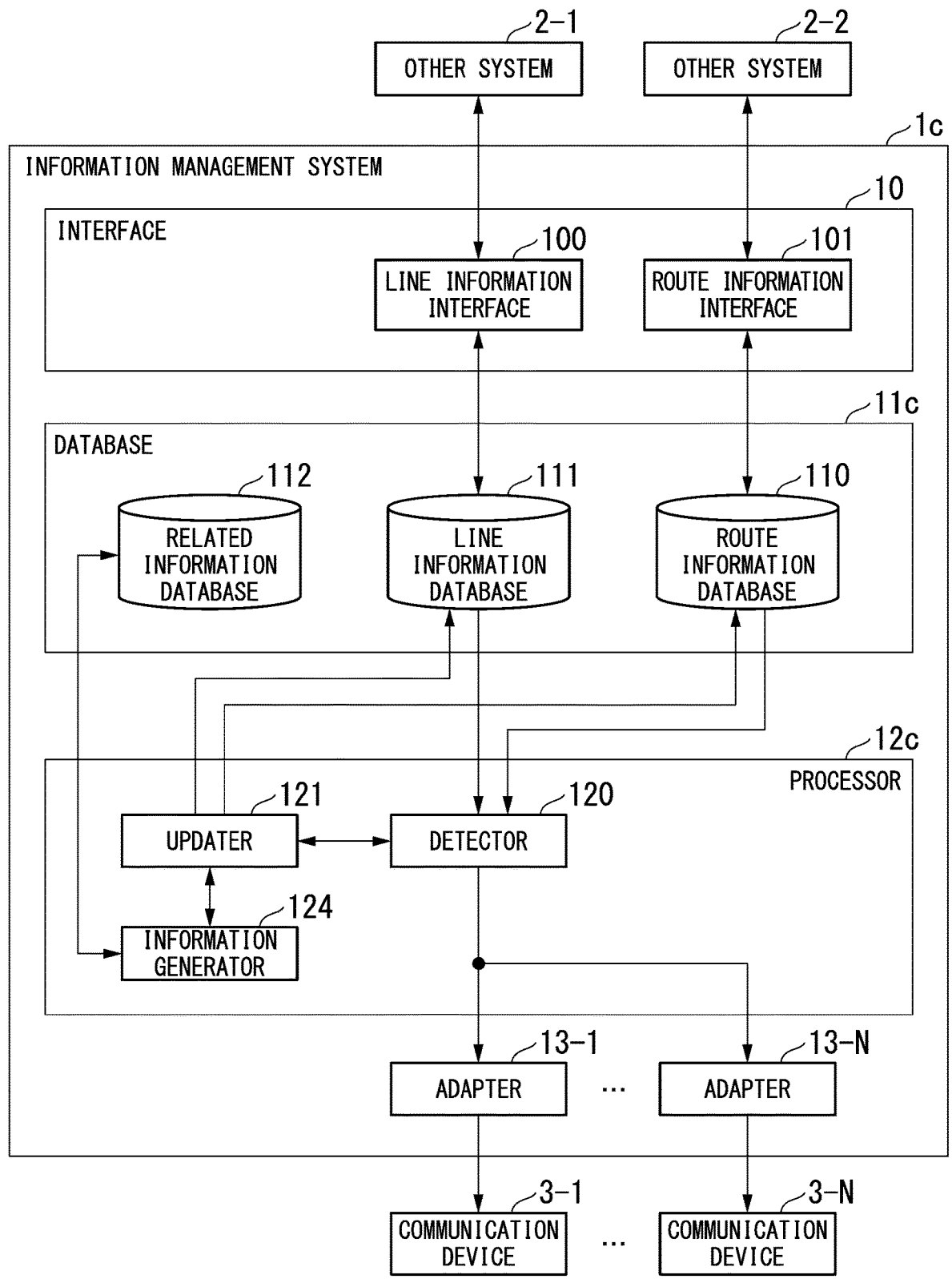
FIG. 9 is a diagram which shows an example of a configuration of an information management system in a third embodiment.

FIG. 9 is a diagram which shows an example of a configuration of an information management system 1c. The information management system 1c includes an interface 10, a database 11c, a processor 12c, and N adapters 13. The database 11c includes the route information database 110, the line information database 111, and the related information database 112. The database 11c may further include the device information database 113. In the third embodiment, the management information is line information as an example.

In the third embodiment, an update source database identifier indicates, for example, the route information database 110. The route information interface 101 acquires information including route information and a device ID to be added to the route information database 110 from the other system 2-2. When a common identifier is a uniquely defined identifier, the route information interface 101 gives a flow ID and the common identifier of a number that is not recorded in the route information database 110 to route information to be added to the route information database 110.

The processor 12c includes a detector 120, an updater 121, and an information generator 124. The detector 120 detects that new route information has been added to a route information data table stored in the route information database 110 according to periodic polling or an addition notification from the route information database 110.

The detector 120 detects that new circuit information has been added to a line information data table stored in the line information database 111 according to periodic polling or an addition notification from the line information database 111.

When information is added to the route information or the line information by the interface 10, the detector 120 outputs an update type indicating the addition, an update source database identifier, attribute information of the route information or the line information newly added by the interface 10, and an update source common identifier to the updater 121. Here, the detector 120 may output a value of the attribute information to the updater 121.

The updater 121 outputs this information acquired from the detector 120 to the information generator 124. The updater 121 acquires a template in which attribute information newly added to an update target database is described from the information generator 124 as a response. The updater 121 outputs a command for storing the template acquired from the information generator 124 to the update target database.

The information generator 124 outputs the update source database identifier acquired from the updater 121 to the related information database 112. The updater 121 acquires an update target database identifier and update target attribute information from the related information database 112 as a response. The information generator 124 stores the template of the data table in advance for each database.

FIG. 10 is a diagram which shows an example of the template of the line information data table shown in FIG. 3. Attribute information (items) of the template of the line information data table includes a device ID, a user name, a VLAN-ID, and a common identifier. A value of attribute information in the template is, for example, a predetermined default value. The attribute information in the template may be, for example, blank (invalid information).

The information generator 124 generates the information newly added to the update target database by using the template of the data table of the update target database. Note that the information generator 124 may generate the information newly added to the update target database on the basis of a rule such as an "IF-THEN rule."

The information generator 124 acquires update source attribute information in an update source database from the updater 121. For example, the information generator 124 acquires a value of the update source attribute information "vlan_vid" in the updated route information database 110 from the updater 121. The information generator 124 describes the update source attribute information that is attribute information newly added in the template of the data table of the update target database. For example, the information generator 124 describes the value of the update source attribute information "vlan_vid" newly added to the update target database in a field of "VLAN-ID" in the template of the data table of the line information database 111. The information generator 124 outputs the template in which the newly added attribute information is described to the updater 121.

The updater 121 outputs the information newly added to the update target database and an addition command to the update target database. When there are a plurality of update target databases, the updater 121 executes description processing of a template and generation processing of an addition command for each update target database.

As described above, the information management system 1c of the third embodiment includes the route information database 110 (also referred to as a "first information storage"), the line information database 111 (also referred to as a "second information storage"), the related information database 112 (also referred to as a "related information storage"), the detector 120, the updater 121, and the information generator 124.

When the addition of first attribute information, which is the attribute information of first information, is detected, the information generator 124 generates second attribute information associated with the first attribute information in the related information data table. When the addition of second attribute information, which is the attribute information of second information, is detected, the information generator 124 generates first attribute information associated with the second attribute information in the related information data table.

The first information is, for example, the route information of the communication device. The second information is, for example, the management information of the communication device. The management information is, for example, line information. The information generator 124 generates the first attribute information or the second attribute information, for example, on the basis of the template of the route information data table or the line information data table. When the second attribute information is generated, the updater 121 outputs a command for adding the second attribute information to the line information database 111. When the first attribute information is generated, the updater 121 outputs the command for adding the first attribute information to the route information database 110.

As a result, the information management system 1c of the third embodiment can curb inconsistency from occurring between the management information and the route information in the information management system 1c of the communication device even when information is newly added to the database by the other system 2.

Embodiments of the present invention have been described in detail above with reference to the drawings, but the specific configuration is not limited to these embodiments, and also includes a design and the like within a range not departing from the gist of the present invention.

First Modified Example

FIG. 11 is a diagram which shows a modified example of the related information database 112. The related information database 112 may store a related information data table including the attribute information of the information stored in three or more databases. In FIG. 11, the items of the related information data table include a route information database, a line information database, and a device information database. When the attribute information is updated in the route information database, the attribute information of the line information database with which the updated attribute information is associated in the related information data table is updated in the line information database. When the attribute information is updated in the route information database, the attribute information of the device information database with which the updated attribute information is associated in the related information data table is updated in the device information database.

The related information database 112 outputs a list of the plurality of database identifiers associated with a database indicated by the update source database identifier in the related information data table to the processor as the list of the plurality of update target database identifiers.

Second Modified Example

The processor may include a plurality of detectors 120 for each database and a plurality of updaters 121 for each database. The detectors 120 notify the plurality of updaters 121 that update databases other than the updated database that a target database whose update is detected by the detector itself has been updated.

Third Modified Example

There may be a plurality of information management systems. The route information database 110 and the line information database 111 may be provided in different information management systems.

INDUSTRIAL APPLICABILITY

The present invention is applicable to a controller of an SDN architecture.

REFERENCE SIGNS LIST

1a~1c Information management system
2 Other system
3 Communication device
10 Interface
11a~11c Database
12a~12c Processor
13 Adapter
100 Line information interface
101 Route information interface
110 Route information database
111 Line information database
112 Related information database
113 Device information database
120 Detector
121 Updater
122 Commander
123 Device information acquirer
124 Information generator

What is claimed is:

1. An information management system comprising:
a first information storage configured to store at least one or more pieces of first attribute information that is attribute information of first information regarding a communication device;
a second information storage configured to store at least one or more pieces of second attribute information that is attribute information of second information regarding the communication device;
a related information storage configured to store related information that is information representing a relationship between the first attribute information and the second attribute information;
a detector configured to detect update, addition, or deletion of the first attribute information or the second attribute information; and
an updater configured to output a command for the update, addition, or deletion of the second attribute information associated with the first attribute information in the related information to the second information storage when the update, addition, or deletion of the first attribute information is detected, and to output the command for the update, addition, or deletion of the first attribute information associated with the second attribute information in the related information to the first information storage when the update, addition, or deletion of the second attribute information is detected, wherein each of the first information storage, the second information storage, the related information storage, the detector, and the updater is implemented by:
i) computer executable instructions executed by at least one processor,
ii) at least one circuitry or
iii) a combination of computer executable instructions executed by at least one processor and at least one circuitry,
wherein the first information is information regarding a route of the communication device, and the second information is information regarding a line,
wherein a plurality of common identifiers are associated with a single piece of attribute information in the route information and a single piece of attribute information in the line information.

2. The information management system according to claim 1, further comprising:
an information generator configured to generate the second attribute information associated with the first attribute information in the related information when the addition of the first attribute information is detected, and to generate the first attribute information associated with the second attribute information in the related information when the addition of the second attribute information is detected,
wherein the updater is configured to output the command for addition of the second attribute information to the second information storage when the second attribute information is generated, and output the command for addition of the first attribute information to the first information storage when the first attribute information is generated.

3. The information management system according to claim 2, wherein the information generator is configured to generate the first attribute information or the second attribute information on the basis of a template.

4. An information management method which is executed by an information management system including a first information storage configured to store one or more pieces of first attribute information that is attribute information of first information regarding a communication device, a second information storage configured to store one or more pieces of second attribute information that is attribute information of second information regarding the communication device, and a related information storage configured to store related information that is information representing a relationship between the first attribute information and the second attribute information, the method comprising:
detecting update, addition, or deletion of the first attribute information or the second attribute information; and
outputting the command for the update, addition, or deletion of the second attribute information associated with the first attribute information in the related information to the second information storage when the update, addition, or deletion of the first attribute information is detected, and outputting the command for the update, addition, or deletion of the first attribute information associated with the second attribute information in the related information to the first information storage when the update, addition, or deletion of the second attribute information is detected,
wherein the first information is information regarding a route of the communication device, and the second information is information regarding a line,
wherein a plurality of common identifiers are associated with a single piece of attribute information in the route information and a single piece of attribute information in the line information.

5. The information management system according to claim 4, further comprising:
an information generator configured to generate the second attribute information associated with the first attribute information in the related information when the addition of the first attribute information is detected, and to generate the first attribute information associated with the second attribute information in the related information when the addition of the second attribute information is detected,
wherein the updater is configured to output a command for addition of the second attribute information to the second information storage when the second attribute information is generated, and output a command for addition of the first attribute information to the first information storage when the first attribute information is generated.

* * * * *